United States Patent [19]
Womack

[11] Patent Number: 5,463,538
[45] Date of Patent: Oct. 31, 1995

[54] HEAD MOUNTED WORK LIGHT

[76] Inventor: Robert C. Womack, 2010 Shea Rd., Dallas, Tex. 75235

[21] Appl. No.: 197,118

[22] Filed: Feb. 16, 1994

[51] Int. Cl.[6] .................................................. F21L 15/14
[52] U.S. Cl. .......................... 362/106; 362/105; 362/287; 362/427
[58] Field of Search ........................... 362/32, 105, 106, 362/187, 190, 191, 287, 427, 304; 21/195.1, 209.13

[56] References Cited

U.S. PATENT DOCUMENTS

| | | | |
|---|---|---|---|
| 1,121,247 | 12/1914 | Hirsch | 362/106 |
| 1,305,852 | 6/1919 | Widmer | 362/105 |
| 1,559,191 | 10/1925 | Smith | 362/105 |
| 1,689,090 | 10/1928 | Watkins | 362/106 |
| 2,304,742 | 12/1942 | Officer et al. | 362/187 |
| 2,344,370 | 3/1944 | Shapiro | 362/32 |
| 2,480,393 | 8/1949 | Bossert et al. | 362/32 |
| 2,629,046 | 2/1953 | Liberman | 362/304 |
| 3,069,538 | 12/1962 | Hobson | 362/105 |
| 3,133,705 | 5/1964 | Eickelman | 362/275 |
| 3,592,199 | 9/1971 | Ostensen | 362/32 |
| 4,090,232 | 5/1978 | Golden | 362/106 |
| 4,450,508 | 5/1984 | Carley | 362/105 |
| 4,530,112 | 7/1985 | Cecala et al. | 362/105 |
| 4,631,645 | 12/1986 | Lenart | 362/105 |
| 4,991,068 | 2/1991 | Mickey . | |
| 5,165,789 | 11/1992 | Womack | 362/391 |

FOREIGN PATENT DOCUMENTS 2569822  3/1986  France .................................. 362/191

Primary Examiner—Carl D. Price
Assistant Examiner—Y. Quach
Attorney, Agent, or Firm—Gregory M. Luck

[57] ABSTRACT

A portable light source is disclosed which is mountable on a hat or cap and includes a light source, a reflector lens, an adjustable mounting bracket, an electrical connector and a portable power source.

16 Claims, 2 Drawing Sheets

HEAD MOUNTED WORK LIGHT

BACKGROUND OF THE INVENTION

1. Field of the Invention

The present invention is directed to portable lighting implements. More specifically, the present invention is directed to a head mounted work light for use with a portable power source.

2. Description of the Prior Art

Innumerable applications require the use of a lightweight, portable light source. For example, mechanics are often faced with the problem of insufficient lighting in the inspection of the underside or internal regions of an automobile or truck, which difficulty has heretofore been addressed by the use of clumsy hanging lights which suffer from their need for a hook or bracket for attachment and which also create undesirable shadows. Moreover, such hanging lights are usually not portable.

Maintenance personnel have also been faced with the inconvenience of available portable light sources in their inspection and maintenance of equipment, passageways, access panels and the like which are generally unlighted. Heretofore, such personal have relied upon handheld flashlights which were many times awkward in that they occupied a hand that might otherwise be needed to complete a certain task. Sportsmen, e.g., backpackers and spelunkers, have also expressed a need for a portable light source since it is often impossible or impractical to carry a handheld flashlight-type light source.

A number of head mounted light sources have been developed to address the above problems. One such head mounted light source is the carbide lamp favored by miners and spelunkers. Disadvantages associated with such lamps, however, concern the noxious fumes and odors emitted by such sources as well as the heat generated by the combustion of the carbide source.

In recent years, battery powered head mounted light sources have also been developed. Such sources, however, are both heavy and cumbersome. Moreover, such sources do not allow for selective aiming of the light beam and furthermore emit a spotlight which is disadvantageous in use around glazed or reflective surfaces due to the glare emitted thereby.

SUMMARY OF THE INVENTION

The present invention addresses the above and other disadvantages of prior art head mounted portable lighting devices.

In a general embodiment, the present invention is comprised of a light source, an interchangeable reflector, an adjustable mounting bracket, an electrical lead and a portable power source, e.g., a rechargeable battery. The lighting device of the present invention may be conveniently mounted on any billable type hat, cap or hard hat and is componentized for ease in inspection, maintenance, and replacement of each of the various parts.

The present invention presents a number of advantages over the art. Once such advantage is a lightweight, portable head mounted light source which may be conveniently mounted on practically any type of billed cap or hat.

A second advantage of the present invention is the diffuse light created by one embodiment of the invention which minimizes glare on the illuminated surfaces. Yet a third advantage of the present invention is a head mounted light source which may be selectively targeted vis-a-vis the movement of the wearer's head.

DETAILED DESCRIPTION OF THE PREFERRED EMBODIMENT

Figure 1:
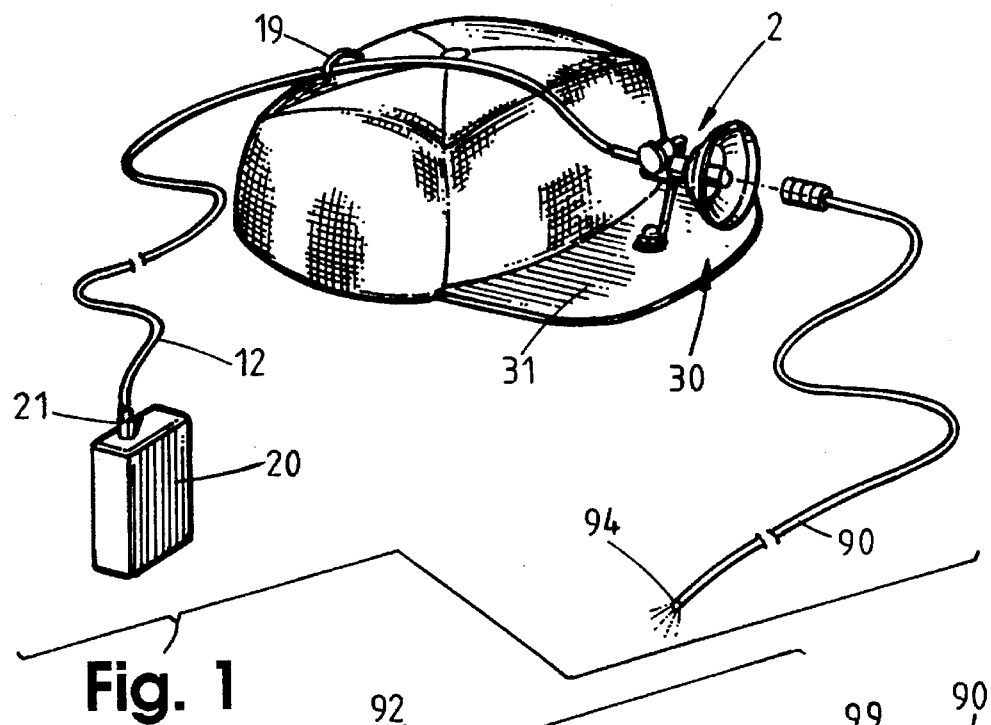
FIG. 1 illustrates a perspective view of two embodiments of the present invention as applied to a conventional hat or cap.
Figure 3:
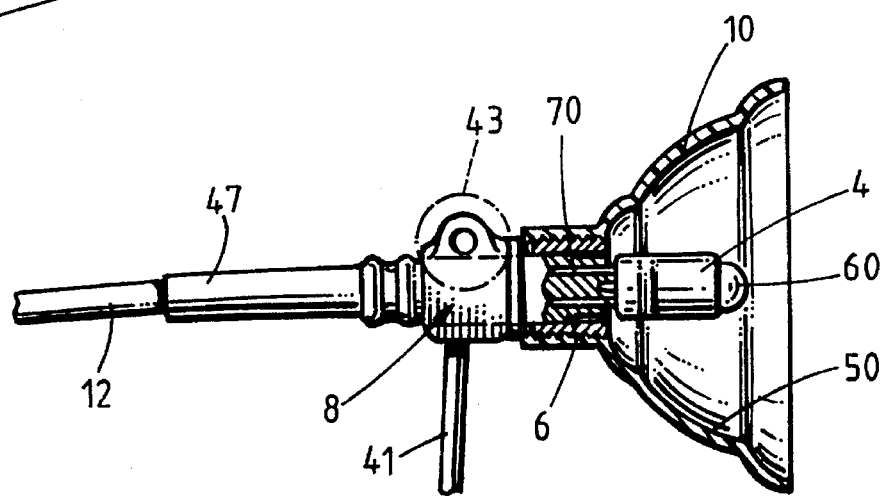
FIG. 3 illustrates a side, cross section of one preferred embodiment of the present invention.
Figure 4:
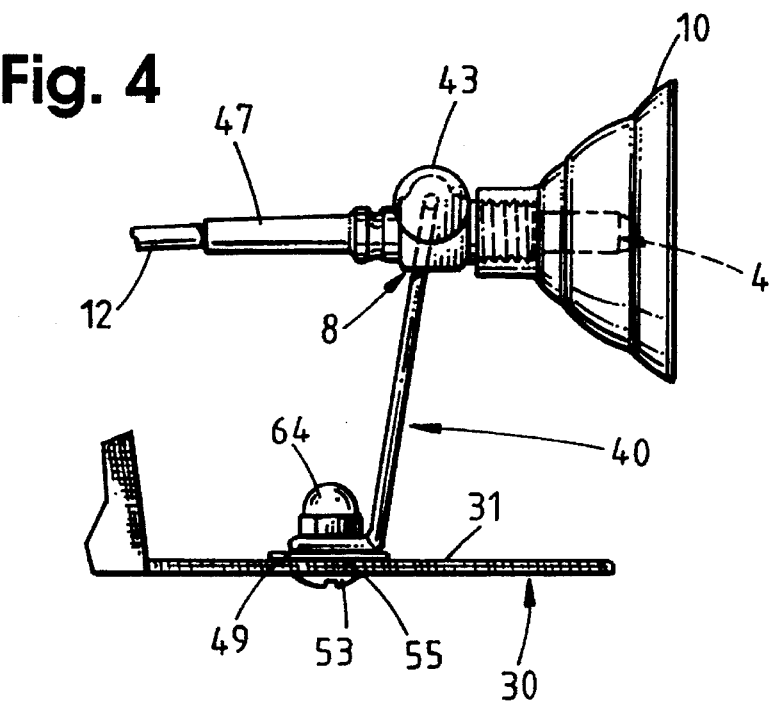
FIG. 4 illustrates a cross sectional detail view of one embodiment of the mounting bracket.
Figure 5:
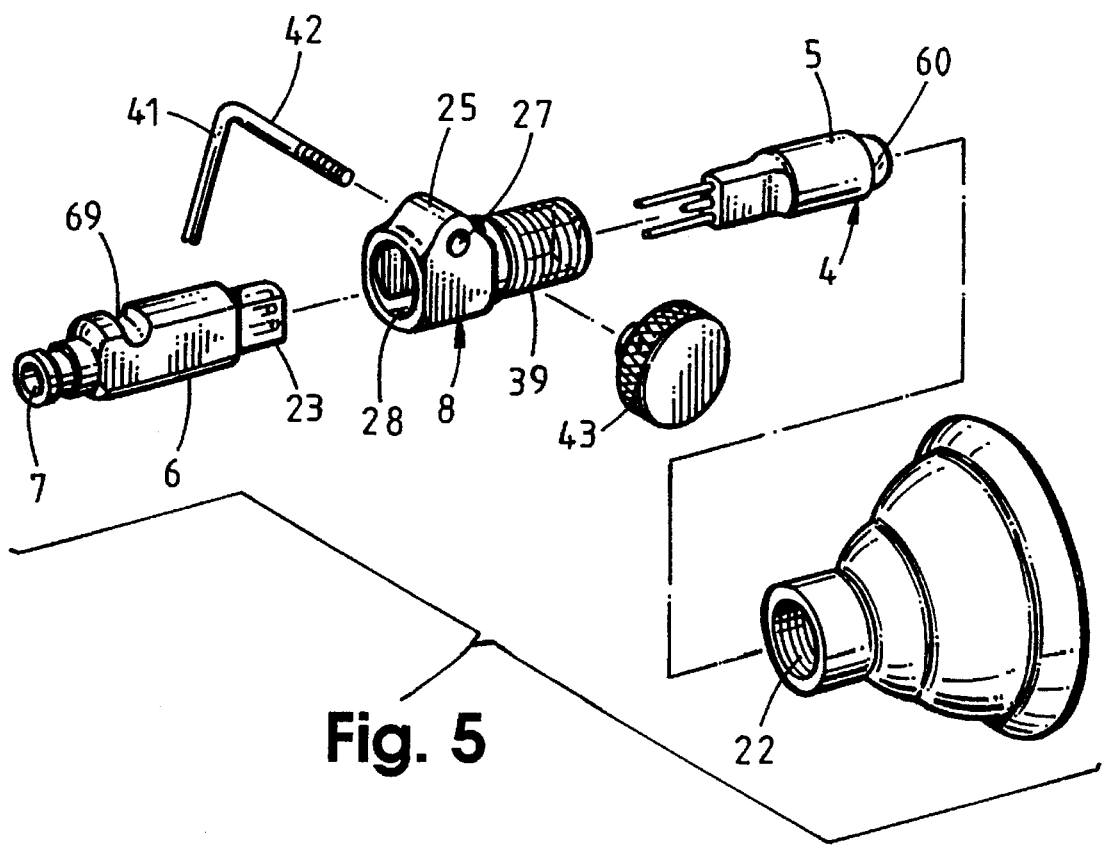
FIG. 5 illustrates an perspective assembly drawing of the embodiment illustrated in FIG. 3.

A preferred embodiment of the work light apparatus 2 of the present invention may be seen by reference to FIG. 1, and in more detail in FIGS. 3–5.

As illustrated in FIG. 1, the present invention is comprised of a lightweight light source 4, a light socket 6, an attachment bracket 8, and a reflector 10, the combination operatively coupled to a power source 20 via an electrical line 12. In the illustrated embodiment, light source 4 and attachment bracket 8 may be mounted on a billed hat or cap 30.

In one preferred embodiment, as illustrated in FIGS. 3, 4 and 5, light source 4 comprises a small diameter, high power light bulb such as an halogen bulb 60. To provide protection from high pressure shattering, bulb 60 is preferably encased in a high temperature, teflon translucent tubular sheath 5 such as that described in U.S. Pat. No. 5,165,789, the disclosure of which is herein incorporated by reference. In such a fashion, sheath 5 protects bulb 60 from dramatic variations in temperature and thus gives apparatus 2 all weather capability. Sheath 5 also serves to more uniformly diffuse the light emitted by bulb 60 as will be further described herein.

Light source 4 is removably receivable in the proximate end 23 of socket 6, which socket 6 also defines a distal end 7 operatively engageable with a power line 12 as illustrated in FIG. 1. In a preferred embodiment, the internal configuration and makeup of socket 6 is that described and disclosed in U.S. Pat. No. 5,165,789 although other relative configurations are also envisioned within the spirit of the invention. It is desirable that power line 12 be engageable to socket 6 via a snap-type or plug-in arrangement although other types of connectors, e.g., a bayonet-type connector, are also contemplated. Both terminal ends of power line 12 may be provided with a tension release, e.g., a resilient shrink wrap coating 47, in a conventional fashion.

Power line 12 is operatively coupled to a portable power source via a conventional, removable plug-in coupling 21. In such a fashion, light source 4 may be selectively actuated by the operator via connection between power line 12 and power source 20. Alternatively, power line 12 or power source 20 may be provided with an on/off switch (not shown) in accordance with conventional teachings. It is also envisioned that it may be desirable in some applications to include a resistor (also not shown) in power line 12 or power source 20 so as to allow the use of a power source of a higher voltage rating than that of light source 4.

As noted, power line 12 is operatively coupled to socket 6 and power source 20. It may be desirable to provide a means to direct or guide cable 12 over and downward with respect to the wearer's head so as to remove line 12 as a potential hazard or nuisance to the wearer. Referring to FIG. 1, in a preferred embodiment hat 30 is provided with a clip 19 about its crown to hold power line 12 and direct it out of the wearer's field of vision downwardly to power source 20. Clip 19 allows line 12 to slide therethrough so as to not hinder the movement of wearer's head.

Power source 20 may constitute a battery pack such as a 7.2 or 9.6 volt nickel-cadmium source disclosed in U.S. Pat. No. 5,217,824. Alternatively, other potential power sources, e.g., an automobile cigarette lighter, are also envisioned within the spirit of the invention.

As illustrated in FIG. 5, light socket 6 is substantially rectangular in cross section although other cross sections, e.g., a circular or ovoid cross section, are also contemplated within the spirit of the present invention. Socket 6 is slidably receivable in attachment bracket 8 which preferably describes a generally elongate body 39 defining a cylindrical bore 28 therethrough, where bore 28 has a cross-section and internal diameter closely matching the cross-section and outer diameter of socket 6 so as to allow for a close tolerance fit therebetween. Bracket 8 is provided with a mounting flange 25 which itself defines a transverse bore 27 which preferably communicates with bore 28 as will be described below. Bore 27 is slidably receivable to the upper terminal end 42 of a mounting assembly 40 which includes a mounting arm 41, a fastener 43 and a mounting plate 49. Preferably, the upper end 42 of assembly 40 is threaded to receive fastener 43 which may be adjusted so as to allow attachment bracket 8 to pivot in one plane about assembly 40 or tightened to secure bracket 8 in a set orientation. A complimentary groove 69 is preferably formed transversely in socket 6 to accommodate end 42 as it is disposed in bore 27. In such a fashion, socket 6 may be prevented from rotating within bore 28 and from sliding longitudinally.

Referring to FIG. 4, mounting assembly 40 is secured to a hat or cap 30 having a bill 31 via a mounting plate 49. Mounting plate 49 is secured to hat 30 via a conventional fastener 53 threaded through an aperture formed in bill 31. In a preferred embodiment, a releasable fastener 53 secured via nut 64 is desired so that the work light 2 may be moved from hat to hat as desired. Additionally, it may be desirable to provide one or more apertures 55 in a given hat so as to allow selective positioning of work light 2.

Light source 4 is preferably provided with a removable, frustro conically shaped reflector 10. In a preferred embodiment, reflector 10 defines about its interior a series of concentric cups having ever greater diameters but similar radii of curvature. For a reflector 10 having a maximum diameter of 1.8 inches it has been found that inner reflector defining a series of stepped bowls or arcuate curved sections each having a radii of 5/8 of an inch performs optimally. Reflector 10 defines an axial tapered bore 22 which is slidably receivable over socket 6 as illustrated in FIGS. 3 and 5. To ensure a snug fit therebetween, it is desirable that there exist an incremental difference in the degree of taper, ideally 1½ degrees, between bore 22 and the outer diameter of socket 6.

It is contemplated that the user may desire reflector 10 to be readily interchangeable between a focused spot beam and a more diffuse or flood light. To this end, reflector 10 in one embodiment is coated on its inner surface 50 with a matte metallic finish so as to produce a diffuse light beam. In one embodiment, this matte finish may be formed as a result of a conventional plating process or derive from a matte metallic paint finish. A spot light beam may be produced by forming inner surface 50 in a parabolic configuration and then coating surface 50 with a high sheen metallic coating, e.g., a chromium coating.

In the instance of a focused or spot light beam, it may be desirable to provide a means of focusing the beam emitted by light source 4. Such a focusing means may be provided by a sleeve 70 threadedly receivable in the bore 22 defined in reflector 10 and slidably engageable over socket 6, the combination such that reflector 10 may be moved axially about sleeve 70 with respect to light source 4, thereby altering the focus of the light beam. Alternatively, focusing means may comprise reflector 10 slidably disposed with respect to sleeve 70.

Figure 2:
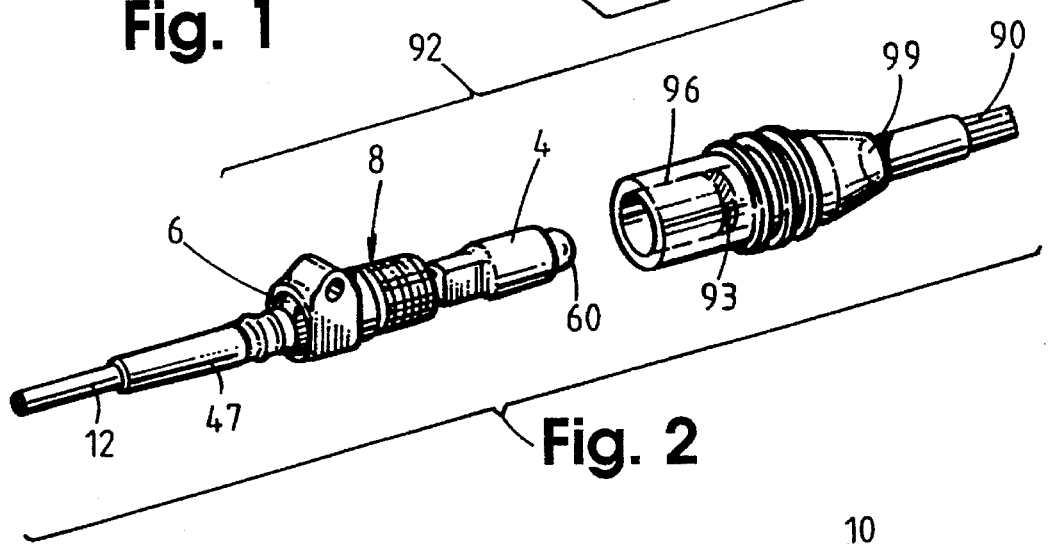
FIG. 2 illustrates a perspective view of one embodiment of the present invention incorporating a fiber optic transmission filament to produce a point light source.

In yet another embodiment of the invention as illustrated in FIGS. 1 and 2, a selected length of insulated fiber optic filament 90 of a uniform diameter, e.g., 3/16 of an inch, is coupled in close proximity to bulb 60 so as to allow for transmission of light therethrough, the combination being disposed in a housing 92 which may include one or more vents 93 to allow for the escape of heat transmitted by bulb 60. In this embodiment, it is contemplated that housing 92 be comprised of socket 6 as earlier described and a coaxially disposed sleeve 96 where said sleeve 96 is provided with an aperture 99 at its terminal end to allow for the throughpassage of a fiber optic filament 90. Socket 6 may be operatively coupled to a power source 20 as previously described. The terminal end 94 of fiber optic filament 90 may be held by the user so as to selectively direct the spot beam produced thereby.

Although particular detailed embodiments of the apparatus have been described herein, it should be understood that the invention is not restricted to the details of the preferred embodiments herein described. Many changes in design, composition, configuration and dimensions are possible without departing from the spirit and scope of the instant invention.

What is claimed is:

1. A portable work light comprising:

a light source comprised of a light bulb mounted within a mounting socket which is slidably disposed within an attachment bracket where said bracket includes a transverse groove formed in said socket and receivable to an attachment arm to prevent the relative rotation of said socket;

a reflector disposed about said socket and bulb where said reflector includes means to focus the light projected by said bulb;

means to mount said light source on a hat or cap including a bill and a crown where said means comprises said attachment arm associated with mounting base, where said base is releasably securable to said hat or cap and where said arm is pivotally oriented with respect to said bracket which is slidably coupled to said socket;

an electrical connector operatively coupled at one end to said mounting socket at the other end to a portable power source.

2. The work light of claim 1 wherein said light bulb is coated with a transparent teflon coating so as to produce a diffuse light beam from said bulb.

3. The work light of claim 2 wherein said light bulb includes a halogen bulb.

4. The work light of claim 1 where said connector is slidably securable to the crown of the cap or hat.

5. The work light of claim 1 wherein said reflector is frustro conical in configuration and is coated about its inner surface with a matte metallic finish.

6. The work light of claim 1 wherein said reflector is conical in configuration and is coated about its inner surface with a high sheen metallic finish to create a high intensity spotlight beam.

7. The work light of claim 6 wherein said means to focus the beam of light projected by said light bulb includes a sleeve slidably disposed about said socket and threadedly receivable to said reflector such that rotation of said reflector results in a change in the relative axial position of said reflector and said bulb.

8. The work light of claim 1 wherein said light source includes at least two degrees of freedom of movement relative to said cap.

9. The work light of claim 1 wherein said reflector describes two cones of varying degrees of curvature arranged in a coaxial relationship so as to optimally diffuse the light projected by said light bulb.

10. A head mounted work light comprising:

a light assembly comprising a light bulb securable within a mounting socket, the combination bulb and socket slidably disposed within a mounting bracket where said bracket includes a transverse groove formed in said socket and receivable to an attachment arm to prevent rotation of said socket relative to said bracket where said bulb is provided with a transparent coating so as to diffuse the light beam emitted thereby;

a reflector mounted coaxially about said mounting socket where said reflector includes means to focus the light projected by said bulb;

said attachment assembly including a mounting arm pivotally coupled to said mounting bracket at its upper end and rotatably coupled to a bill of a hat or cap at its bottom end; and an electrical connector attached at one end to the mounting socket and at its other end to a portable power source.

11. The work light of claim 10 wherein said bulb includes a halogen bulb

12. The work light of claim 10 wherein said bulb is at least partially enclosed within a teflon sheath.

13. The work light of claim 10 wherein said reflector describes a frustro cone and is coated about its interior surface with a matte finish so as to produce a diffused beam.

14. The work light of claim 10 wherein said reflector is coated about its interior surface with a reflective metallic coating.

15. The work light of claim 14 wherein said reflector is provided with means to focus the light beam emitted by said light source and said reflector.

16. The work light of claim 10 wherein said reflector describes two cones of varying degrees of curvature arranged in a coaxial relationship so as to optimally diffuse the light projected by said light bulb.

\* \* \* \* \*